(12) United States Patent
Papini (10) Patent No.: US 12,278,559 B2
(45) Date of Patent: *Apr. 15, 2025

(54) POWER FACTOR CORRECTION CIRCUIT

(71) Applicant: DRP Holdings LLC, Indianapolis, IN (US)

(72) Inventor: Michael Papini, Indianapoolis, IN (US)

(73) Assignee: DRP Holdings LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,066

(22) Filed: Jan. 2, 2024

(65) Prior Publication Data

US 2025/0015712 A1    Jan. 9, 2025

Related U.S. Application Data

(63) Continuation of application No. 17/720,800, filed on Apr. 14, 2022, now Pat. No. 11,870,339.

(51) Int. Cl.
*H02M 1/42* (2007.01)
*G05F 1/70* (2006.01)
*H02M 3/155* (2006.01)
*H02P 23/26* (2016.01)

(52) U.S. Cl.
CPC ......... *H02M 1/4216* (2013.01); *H02M 3/155* (2013.01); *G05F 1/70* (2013.01); *H02M 1/4208* (2013.01); *H02M 1/4225* (2013.01); *H02M 1/4266* (2013.01); *H02P 23/26* (2016.02)

(58) Field of Classification Search
CPC ............ H02M 1/4208; H02M 1/4225; H02M 1/4266; G05F 1/70
See application file for complete search history.

(56) References Cited

U.S. PATENT DOCUMENTS

| | | | |
|---|---|---|---|
| 4,333,046 A | 6/1982 | Lee | |
| 7,995,362 B2 * | 8/2011 | Paull | H02M 7/5387 363/131 |
| 8,289,004 B2 * | 10/2012 | Hung | H02M 1/4208 320/166 |
| 8,325,500 B2 * | 12/2012 | Schueneman | H02M 1/126 363/47 |
| 8,508,166 B2 | 8/2013 | Marcinkiewicz et al. | |
| 9,755,568 B2 | 9/2017 | Skinner et al. | |
| 9,800,140 B2 | 10/2017 | Wen et al. | |
| 10,153,721 B2 | 12/2018 | Tseng et al. | |
| 10,518,662 B2 | 12/2019 | Schumacher | |
| 2018/0097442 A1 * | 4/2018 | Niu | H02M 1/4266 |

* cited by examiner

*Primary Examiner* — Gary A Nash
(74) *Attorney, Agent, or Firm* — Woodard Emhardt Henry Reeves & Wagner LLP

(57) ABSTRACT

A power factor correction circuit configured to increase the amount of useful power in an AC electrical system. The power factor correction circuit optionally includes one or more capacitors and one or more resistors configured to realign a phase angle between a voltage and current of an AC power source. Examples are offered illustrating the disclosed circuit in use with a single phase or multi-phase AC power source ranging in voltage from 100 volts or less to 500 volts or more.

20 Claims, 7 Drawing Sheets

POWER FACTOR CORRECTION CIRCUIT

BACKGROUND

The present disclosure generally involves a power factor correction circuit for increasing the efficiency of an AC power source. In an electrical system, reactive loads, such as inductors and/or capacitors can cause inefficiencies where some of the supplied power is wasted and not delivered to load. For example, in some electrical systems less than 75% or less than 90% of power delivered by a power source is available for use.

SUMMARY

Disclosed are examples of a power factor correction circuit configured to increase the amount of useful power delivered to a load in an electrical system. In one example, a power factor correction circuit optionally includes a first RC circuit including a first resistor and a first capacitor that may be electrically connected to a first node and a second node, and the first and second nodes may be electrically connected to separate terminals of an AC power source. A second separate RC circuit may be included that has a second resistor and second capacitor electrically connected to the first node and the second node. In another aspect, first and second resistors are between 250 and 650 kiloohms. In another aspect, the first and second capacitors are between 15 and 50 microfarads. In another aspect, the first resister may be electrically connected in parallel with the first capacitor, and the second resistor may be electrically connected in parallel with the second capacitor.

The AC power source may provide single phase AC power, or multi-phase AC power having multiple individual power sources operating together. For example, the AC power source may have two power sources that are in phase, two power sources that are, for example 180 degrees out of phase, three power sources that are, for example 120 degrees out of phase, or any number of other sources that vary with time in any suitable manner.

In another example, an electrical system includes a power factor correction circuit of the present disclosure. The system may also include a vehicle, a power source, and a load. In one aspect, the vehicle may be a vehicle such as a tractor-trailer, recreational vehicle, food truck, or other vehicle having a portable power source such as a generator, battery pack, and the like. In another aspect, the power source may be a diesel generator electrically connected to a portable refrigeration unit such as in the case of a refrigerated or "reefer" style trailer. Such trailers may be useful for maintaining a temperature controlled climate inside the trailer while transporting food or other products to market.

The load may include a Heating, Ventilation, and Air Conditioning (HVAC) system with compressor, condenser, evaporator, metering device, and other components circulating a refrigerant in a closed loop for the purpose of either heating or cooling an enclosed space. The HVAC system may be integral to the trailer, such as in the case of a built-in, or separate from the trailer, such as in the case of a portable unit designed to be easily separable from the trailer. Similarly, a diesel generator operating as a power source for the disclosed circuit may be integral to a trailer or other vehicle which may be built into the trailer or a portable unit configured to easily separate from trailer.

In another aspect, the disclosed power source may include a cord plugged into a power outlet in the case of where the disclosed power factor correction circuit operates in conjunction with power provided by the power grid. In another example, disclosed circuit or source which includes an inverter that is operable to convert DC power to AC power.

Further forms, objects, features, aspects, benefits, advantages, and embodiments of the present invention will become apparent from a detailed description and drawings provided herewith.

DETAILED DESCRIPTION

Figure 1:
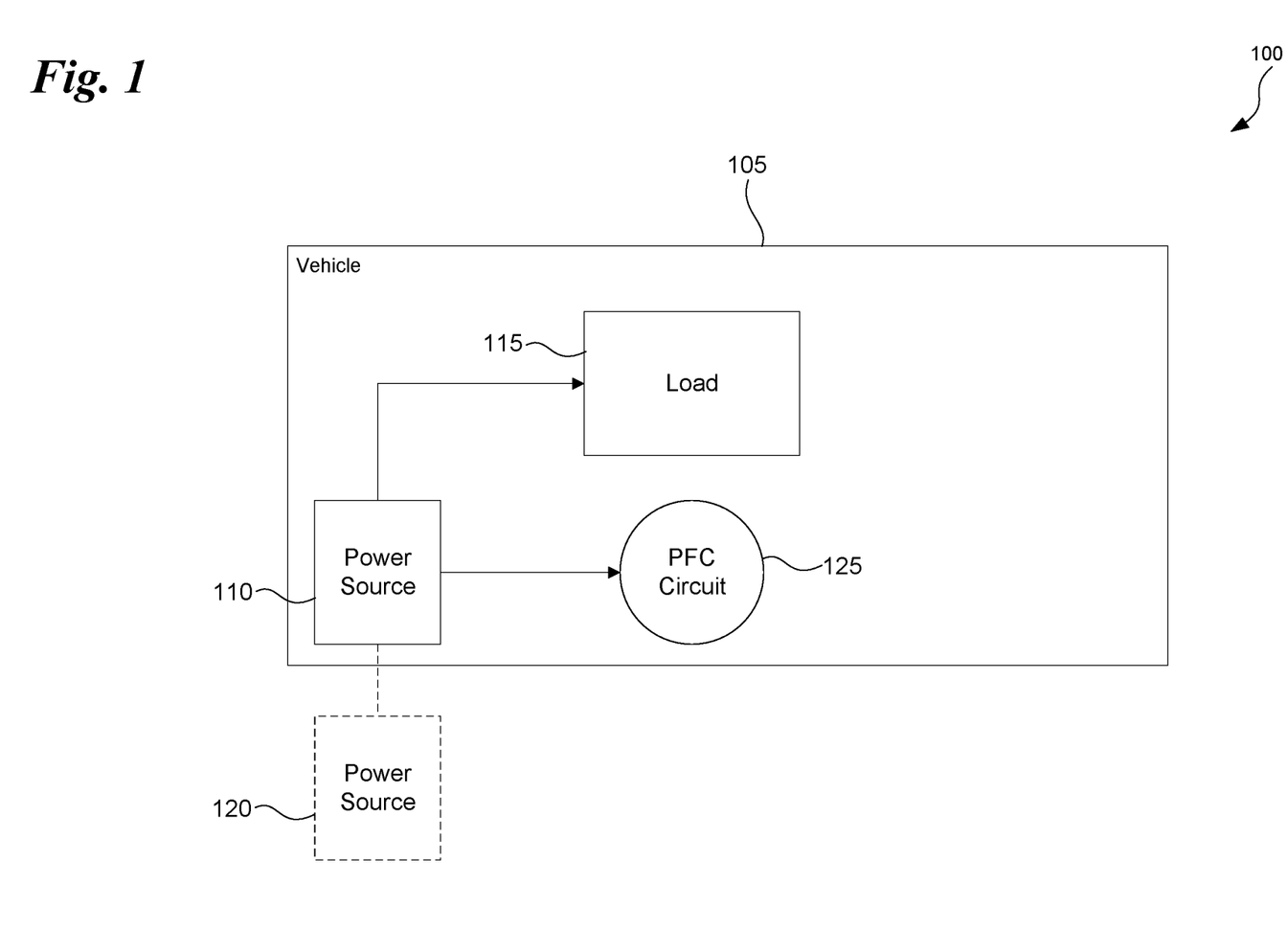
FIG. 1 is a component diagram illustrating one example of a power factor correction system of the present disclosure configured for use in a vehicle.

FIG. 1 illustrates one example of the disclosed power factor correction system that at 100. The power factor correction system 100 optionally includes a vehicle 105, although the disclosed power factor correction system may be used with any AC power source load irrespective of whether or not the power source and load are included vehicle. For example, a power source 110 may be included vehicle, or an external power source 120 may optionally be used as well.

In one example, vehicle 105 is a trailer configured for connection to a tractor, and the trailer may include climate control aspects such as a Heating, Ventilation, and Air Conditioning (HVAC) system. In yet another example, the vehicle 105 is a box truck, such as in the case of a climate controlled truck that may also include an HVAC system. The load 115 may thus include a system that requires electrical power to operate and is electrically connected to a power source 110 or 120 such that the load receives power from either power source, or both power sources. Other power loads may be included and electrically connected to power source 110 and/or power source 120. Other examples of vehicle that may include the disclosed power factor correction system include, but are not limited to, a bus, recreational vehicle, or emergency vehicle such as a mobile command post for law enforcement, a fire truck, an ambulance, and the like. In another example, vehicle 105 may be a military vehicle such as a command-and-control vehicle, a mobile radar installation, or other vehicle that requires an AC power source.

In one example, the vehicle 105 is configured to house a power source 110 such as where a generator or battery pack mounted to the vehicle five in the case of a battery pack, power source may optionally include an inverter that is configured to accept DC power and to create from it an AC power output. In one aspect, the power source 110 may be a generator, such as a diesel, gasoline, propane, or other generator. In another example, the power source 120 may be located outside and separate from the vehicle 105 such as in the case of power connection to the power grid. Power source 120 may be engaged by a charging cord, or other electrical connection between the load 115 power source 120. One example, the power source 120 is an electric charging device which may provide an alternating current and/or direct-current. In yet another example, the power source for the load 115 may include a combination of power sources 110 and 120. For example, a generator may be activated when the vehicle 105 is not plugged-in, and may be deactivated automatically when the vehicle 105 is plugged in the external power source 120. Whether the power sources maintained within the vehicle, or outside the vehicle, the disclosed power factor correction circuit configured provide power factor correction for the load 115.

The power factor correction system 100 further includes a power factor correction circuit 125. Generally, the power factor correction circuit 125 is electrically connected with the power source 110 or 120, or both. In one example, the load 115 and the power factor correction circuit 125 are connected in parallel with the power source. However, in other embodiments, the load 115 and the power factor correction circuit 125 may be connected in series with the power source. For example, the power factor correction circuit 125 may be located upstream of the load 115 such that electrical power from the power source flows through the power factor correction circuit 125 before passing to the load 115.

In another aspect, the power factor correction circuit 125 may be included with the load 115. For example, the power factor correction circuit 125 may be mounted to the load, or included as an integral component of the load 115. This may be advantageous where load may be electrically connected to multiple different power sources in the course of time and may thus enjoy the benefits of increased power factor correction despite continually changing power sources. For example, the power factor correction circuit 125 may be an integral component of a refrigeration unit, a portable lamp assembly, or a portable radio transmitter or receiver.

In another aspect, the power factor correction circuit 125 may be included with the power source or be physically mounted to the power source so that the benefits of increased power factor correction may be realized without requiring each separate load to include its own power factor correction capabilities. For example, the power factor correction circuit 125 may be an integral component of a generator.

The power factor correction circuit 125 is optionally configured to increase efficiency of the power factor correction system 100. For example, the power factor correction circuit 125 may decrease the overall fuel consumption of the generator. Generally, the power factor correction circuit 125 is operable to align a phase angle of the voltage and current of the power factor correction system 100. With reactive loads, such as capacitors and/or inductors, the reactive nature of the load causes the voltage and current waveforms to shift out of phase. When the voltage and current waveforms are out of phase, the efficiency of the system is compromised. For example, when the voltage and current waveforms are out of phase, a power factor of the system is reduced. Generally, the power factor is described as the ratio of power absorbed by the load to the rated, apparent, power in the circuit. Thus, a power factor of unity (1) indicates full use of the power within the circuit. Whereas a power factor of 0.5 indicates that half of the power delivered by the source is available for use by the load.

A power factor correction circuit is optionally used to adjust the phase angle between the voltage and current to bring the power factor value nearer to unity (1) to reduce or eliminate the power difference between what is delivered and what is used. In one aspect, adding an inductor to a power factor correction circuit adjusts the current to lag (fall behind) the voltage waveform by 90 degrees. In another aspect, adding a capacitor to a power factor correction circuit adjusts the voltage to lag (fall behind) the current waveform by 90 degrees. Adding a resistor to a power factor correction circuit generally does not affect the phase angle as resistive loads do not cause a phase shift in the current or voltage.

Figure 2:
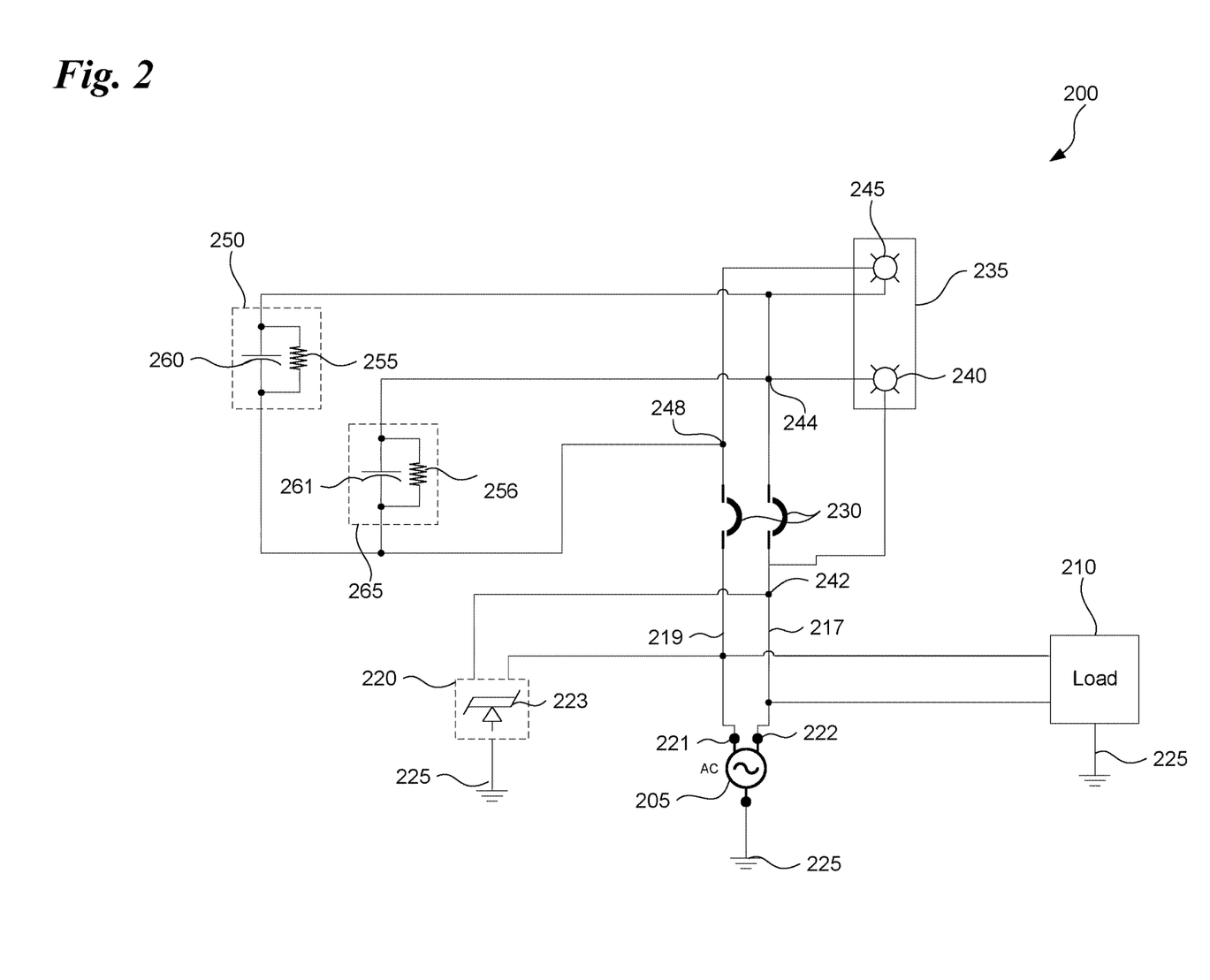
FIG. 2 is a schematic diagram illustrating another example of a power factor correction circuit of the present disclosure.

FIG. 2 shows an example of the disclosed power factor correction circuit at 200. The power factor correction circuit 200 generally receives power from an Alternating Current (AC) power source 205. In one example, the power source 205 may be a 110-120V or 220-240 V AC source. In another aspect, the AC source 205 may operate as a single phase AC power source. The power source 205 is optionally configured to supply power to a load 210 and a power factor correction circuit 200 via a first line 217 and a second line 219. The first line 217 may be electrically connected to a terminal 221 of the AC power source, and the second line 219 may be electrically connected to a separate terminal 222 of the AC power source.

In one example, the load 210 and the power factor correction circuit 200 are electrically connected in a parallel arrangement with the power source 205. However, in another example, the load 210 and the power factor correction circuit 200 may be connected in series with the power source 205. For example, the power factor correction circuit 200 may be located upstream of the load 210 such that power flows through the power factor correction circuit 200 to the load 210.

In another aspect, the load 210 may require 110-120 V AC from the power source 205, and thus the voltage across the first and second lines 217 and 219 may be 110-120 V AC. In this configuration, the power source may provide only a single phase power source providing a time varying voltage on one of lines 217 or 219. In another aspect, one of lines 217 and 219 may operate as a "hot" or "power" line, while the other line may operate as a neutral line, which may be electrically connected to an earth ground. In this configuration, the separate terminals of the AC power source 205 may include a neutral terminal and a hot terminal, and node 244 is optionally electrically connected to the hot terminal, and the node 248 is optionally electrically connected to the neutral terminal.

In another aspect, the load 210 may require 220-240 V AC and thus the voltage across the first and second lines 217 and 219 may be 220-240 V AC. In this configuration, the power source may be a single phase power source, or optionally a two phase power source, which is to say, the lines 217 and 219 may both be electrically connected to separate time varying voltage sources provided by AC source 205. The one of lines 217 and 219 may both operate as a "hot" or "power" lines. In this configuration the separate terminals of the AC power source 205 include two hot terminals 221 and 222, and nodes 244 and 248 are each electrically connected to one of the two hot terminals 221 and 222.

For loads requiring DC power, a power conversion circuit, which may include a rectifier, may be optionally electrically connected between the load 210 and the power source 205 to convert the AC from power source 205 to DC power.

The power factor correction circuit 200 further may include a surge suppressor circuit 220 that optionally includes a Transient Voltage Surge Suppressor (TVSS) component 223, and other components as needed, to protect the load 210 and the power factor correction circuit 200 from large transient voltage spikes that may occur. For example, the surge suppressor circuit 220 is optionally configured to allow a normal voltage to pass into the power factor correction circuit 200 while simultaneously diverting the excess voltage to ground 225. The surge suppression circuit 220 is optionally connected to both the first line 217 and second line 219 in order to monitor the voltage from power source 205.

In another aspect, the power factor correction circuit 200 optionally includes one or more circuit breakers 230. The circuit breakers 230 are optionally configured to protect the power factor correction circuit 200 from excessive current loads. The circuit breakers 230 may be configured as two separate breakers, a single breaker with separate physical switches, or as a single breaker with a single physical switch. The breakers 230 may be configured with preconfigured maximum current values such as 10 A, 20 A, 30 A, and greater than 30 A or less than 10 A. Any suitable breaker may be used. In normal operation, if the breakers 230 experience a surge in current over the expected value, the breakers 230 are configured to "trip" and/or fail open creating an open circuit and breaking the flow of current. The power factor correction circuit 200 may have a single breaker spanning both the first line 217 and the second line 219 and/or the power factor correction circuit 200 may have a separate breaker for both the first line 217 and the second line 219.

The power factor correction circuit 200 optionally includes a fault detection system 235. The illuminated fault detection system 235 is optionally configured to indicate a status of the power factor correction circuit 200. The fault detection system 235 may include a first status indicator 240 and a second status indicator 245. The first status indicator 240 is electrically connected to a node 242 upstream of the breakers 230 and a node 244 downstream of the breakers 230. The first status indicator 240 is optionally configured to illuminate when the breakers 230 are tripped. For example, the first status indicator 240 may be operable to illuminate when the breakers 230 are tripped via the voltage differential between node 242 and node 244. When breakers 230 are closed ("not tripped"), a short circuit exists between nodes 244 and 242. Thus the voltage drop across these two nodes is zero, and this voltage may be used by the fault detection circuit to trigger the first indicator 240 to indicate normal operations. For example, the first indicator may be a red lamp that is inactive when the circuit is operating normally. When breakers 230 are open ("tripped"), an open circuit exists between nodes 244 and 242. Thus the voltage drop across nodes 242 and 244 nodes is no longer zero, and thus first indicator 240 may be activated to indicate a fault condition.

In another aspect, the second status indicator 245 is optionally configured to activate when the breakers 230 are not tripped. For example, the second status indicator 245 may be electrically connected to illuminate according to the voltage differential between node 244 and node 248—which here coincides with the voltage difference across lines 217 and 219 as provided by AC power source 205. When breakers 230 are set, the voltage across nodes 244 and 248 is not zero, and the fault detection system 235 may accept this as input and may be configured to activate indicator 245 accordingly. When breakers 230 are tripped, the voltage across nodes 244 and 248 is zero, or about zero, and the fault detection system 235 may accept this as input and may be configured to deactivate indicator 245 accordingly. the fault detection system 235 may monitor other aspects of the system include voltage, current, and the physical position of the components such as the breaker, in order to detect when a fault has occurred.

The power factor correction circuit 200 optionally includes a first RC ("Resistor/Capacitor") circuit 250 that optionally includes a resistor 255 and a capacitor 260. The resistor 255 and capacitor 260 may be electrically connected to node 248 and 244 as illustrated. A second RC circuit 265 optionally includes a resistor 256 and a capacitor 261 which may be electrically connected in parallel to each other, and may be electrically connected to nodes 248 and 244. These nodes may be electrically connected to separate terminals 221 and 222 of the AC power source 205.

The resistors 255 and 256 may define any suitable resistance value, such as a resistance of less than 250 kiloohms, or 250-650 kiloohms, or a resistance that is greater than 650 kiloohms. The capacitors 260 and 261 may define any suitable capacitance such as a capacitance that is less than 15 microfarads, or 15 to 50 microfarads, or a capacitance that is greater than 50 microfarads. In one example, the resistor 255 optionally has a resistance of 460 kiloohms and the capacitor 260 optionally has a capacitance of 30 microfarads. For example, the resisters 255 and 256 may be electrically connected in parallel with the capacitors 260 and 261 respectively, for one or both of the RC circuits.

The RC circuit 250 is optionally connected to node 244 on the first line 217 and at node 248 on the second line 219. The RC circuit 265 is also optionally connected to node 248 on the second line 219 and at node 244 on the first line 217.

In one aspect, either of the capacitors 260 or 261 of either one or both of the RC circuits 250 and 265 optionally includes an anode and a cathode, wherein the anode of the capacitors is electrically connected to node 244, and wherein the cathode of the first or second capacitors is electrically connected to node 248.

Figure 3:
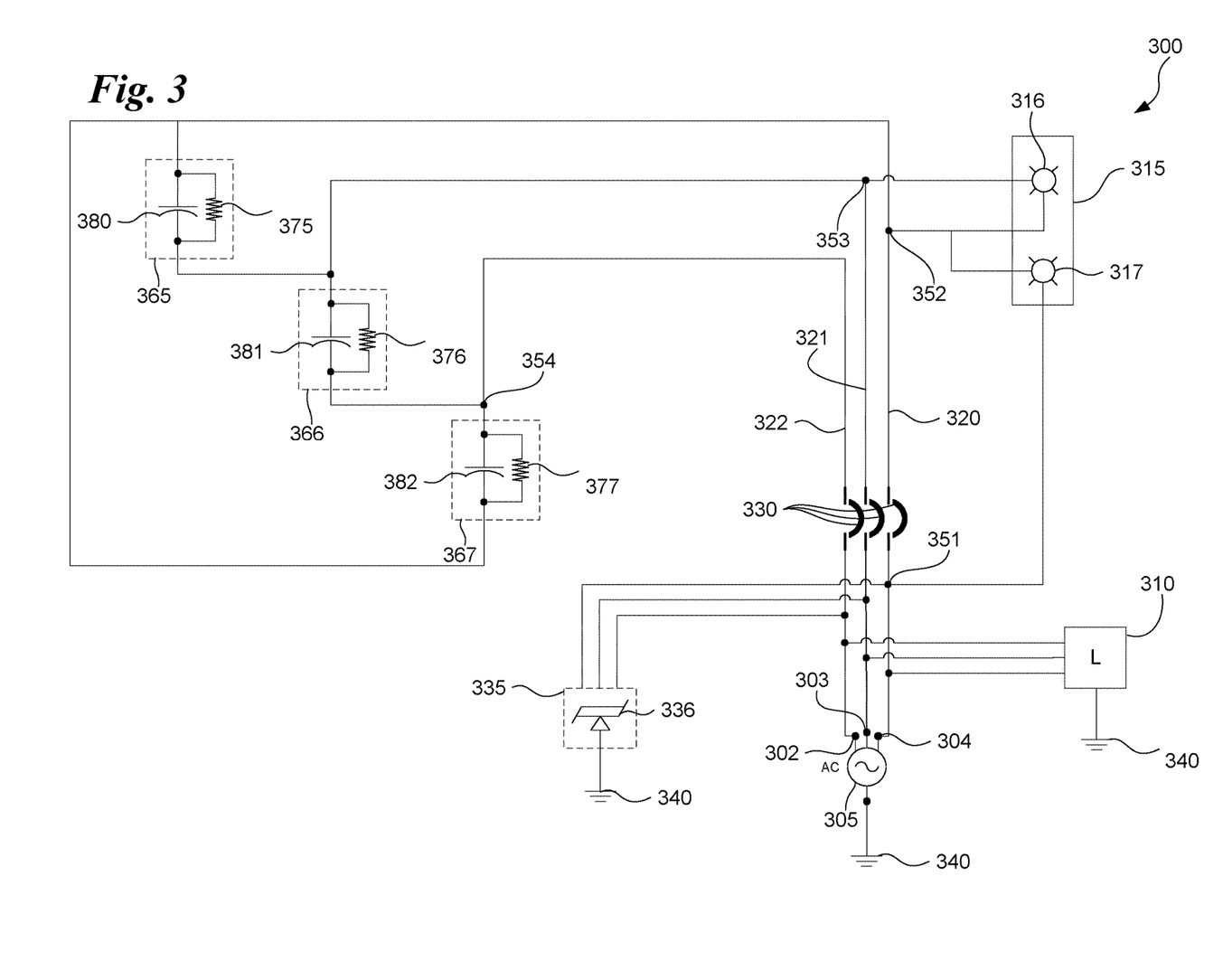
FIG. 3 is a schematic diagram illustrating another example of a power factor correction circuit of the present disclosure.

Illustrated in FIG. 3 at 300 is another example of the disclosed power factor correction circuit implemented to operate with a multi-phase power source, here illustrated as 3-phase AC power 305. The power source 305 is configured to supply power to a load 310 that is optionally electrically connected to the power source 310 in parallel with the power factor correction circuit 315. However, in another example, the load 310 and the power factor correction circuit 315 may be connected in series with the power source 305. For example, the power factor correction circuit 315 may be located upstream of the load 310 such that power flows through the power factor correction circuit 315 to the load 310. In another aspect, a load 310 requiring DC power may include a converter and/or a rectifier circuit between the load and the AC power source 305 to convert from AC to DC power.

In one aspect, the power source 305 may be configured to supply power to load 310 and a power factor correction circuit 315 via a first line 320, a second line 321, and a third line 322. In another aspect, the lines 320, 321, and 322, may be electrically connected to power source 305 at terminals 304, 303, and 302 respectively. These separate terminals of the AC power source may be configured as "hot" terminals, and the AC power source may provide separate ground and neutral terminals as well. In another aspect, the AC power 305 source optionally provides differing time varying voltages to the terminals 302-304. These time varying voltages may vary out of phase with one another, or may vary together in phase depending on the application. In another aspect, the time varying voltages may vary 120 degrees out of phase with each other.

The power source 305 may supply any suitable voltage, such as greater than 200 V AC, greater than 400 V AC, greater than 600 V AC, or more. In another aspect, the voltage across any two of the lines 320, 321, and 322 may be 400 V AC or less, or between 400 V AC and 600 V AC, or greater than 600 V AC. In one example, the voltage across any two of lines 320, 321, and 322 may be 440 V AC, while the voltage across any one of lines 320, 321, and 322 and a neutral line of AC power source 305 may be 220 V AC. In another example, the voltage across any two of lines 320, 321, and 322 may be 400 V AC, while the voltage across any one of lines 320, 321, and 322 and the neutral line of AC power source 305 may be 230 V AC. In another example, the voltage across any two of lines 320, 321, and 322 may be 415 V AC, while the voltage across any one of lines 320, 321, and 322 and a neutral line of AC power source 305 may be 240 V AC. In another example, the voltage across any two of lines 320, 321, and 322 may be 440 V AC, while the voltage across any one of lines 320, 321, and 322 and a neutral line of AC power source 305 may be 277 V AC.

The three-phase power factor correction circuit 300 further includes a surge suppressor circuit 335 that may include a TVSS component 335, and other components as needed, to protect the load 310 and the power factor correction circuit 300 from large transient voltage spikes that may occur on lines 320-322. Surge suppressor circuit 335 is optionally connected to the lines 320-322 in order to directly monitor the voltage and address any over voltage situations. For example, the surge suppressor circuit 335 is optionally configured to allow a normal voltage to pass into the load 310 and the power factor correction circuit 315 while simultaneously diverting the excess voltage to ground 340.

In another aspect, the power factor correction circuit 300 optionally includes one or more circuit breakers 330. The circuit breakers 330 are optionally configured to protect the power factor correction circuit 300 from excessive current loads. The power factor correction circuit 300 may have a single breaker spanning all of the lines 320-322 and/or the power factor correction circuit 300 may have a separate breakers for each of lines 320-322, or any combination of lines 320-322. The circuit breakers 330 may be configured as three separate physical breaker devices, two separate physical breaker devices, a single breaker devices with separate physical switches, or as a single breaker device with a single physical switch. The breakers 330 may be configured with preconfigured maximum current values such as 10 A, 20 A, 30 A, and greater than 30 A or less than 10 A. Any suitable breaker may be used. In normal operation, if the breakers 330 experience a surge in current over the expected value, the breakers 330 are configured to "trip" and/or fail open creating an open circuit and breaking the flow of current.

The power factor correction circuit 300 optionally includes a fault detection system 235. The illuminated fault detection system 315 is optionally configured to indicate a status of the power factor correction circuit 300. The fault detection system 315 may include a first status indicator 317 and a second status indicator 316. The first status indicator 317 may be electrically connected to a node 351 upstream of the breakers 330 and a node 352 downstream of the breakers 330. The first status indicator 317 is optionally configured to illuminate when the breakers 330 are tripped. For example, the first status indicator 317 may be operable to illuminate when the breakers 330 are tripped via the voltage differential between node 351 and node 352. When breakers 330 are closed ("not tripped"), a short circuit exists between nodes 351 and 352. Thus the voltage drop across these two nodes is zero, and this voltage may be used by the fault detection circuit to activate the first indicator 317 to indicate normal operations. For example, the first indicator may be a red lamp that is inactive when the circuit is operating normally (breakers 330 are not "tripped"). When breakers 330 are open ("tripped"), an open circuit exists between nodes 351 and 352. Thus the voltage drop across nodes 351 and 352 nodes is no longer zero, and first indicator 316 may be activated to indicate a fault condition.

In another aspect, the second status indicator 315 is optionally configured to activate when the breakers 330 are not tripped. For example, the second status indicator 316 may be electrically connected to illuminate according to the voltage differential between node 352 and node 353—which here coincides with the voltage difference across lines 320 and 321 as provided by AC power source 305. When breakers 330 are set, the voltage across nodes 352 and 353 is not zero, and the fault detection system 315 may accept this as input and may be configured to activate indicator 316 accordingly. When breakers 330 are tripped, the voltage across nodes 352 and 353 is zero, or about zero, and the fault detection system 315 may accept this as input and may be configured to deactivate indicator 316 accordingly. the fault detection system 315 may monitor other aspects of the system include voltage, current, and the physical position of the components such as the breaker, in order to detect when a fault has occurred.

The power factor correction circuit 300 optionally includes a first RC ("Resistor/Capacitor") circuit 380 that optionally includes a resistor 375 and a capacitor 365. The resistor 375 and capacitor 365 may be electrically connected to node 352 and 353 as illustrated. A second RC circuit 366 optionally includes a resistor 376 and a capacitor 381 which may be electrically connected in parallel to each other with respect to power source 305, and may be electrically connected to nodes 353 and 354. Node 352 may be electrically connected to terminal 304 of the AC power source 305, node 353 may be electrically connected to terminal 303 of the AC power source 305, and terminal 354 may be electrically connected to terminal 302 of the AC power source 305.

The resistors 380-382 may define any suitable resistance value, such as a resistance of less than 250 kiloohms, or 250-650 kiloohms, or a resistance that is greater than 650 kiloohms. The capacitors 380-382 may define any suitable capacitance such as a capacitance that is less than 15 microfarads, or 15 to 50 microfarads, or a capacitance that is greater than 50 microfarads. In one example, the resistors 375-377 optionally have a resistance of 460 kiloohms and the capacitor 380-382 optionally have a capacitance of 30 microfarads. For example, the resisters 375-377 may be electrically connected in parallel with the capacitors 380-382 respectively, for one of, or any combination of, the RC circuits 365-367.

In another aspect, the RC circuit 365 is optionally connected to node 352 on the line 320, and at node 353 on the line 321. The RC circuit 366 is optionally connected to node 353 on the line 321, and at node 354 on the line 322. The RC circuit 367 is optionally connected to node 354 on the line 322, and at node 352 on the line 321.

In one aspect, the capacitors 380-381 of any of the RC circuits 365-367 optionally include an anode and a cathode, wherein the anode of the capacitors is electrically connected to node 352 for capacitor 380, node 353 for capacitor 381, and/or node 354 for capacitor 372, and wherein the cathode of the capacitors 380-382 are electrically connected to node 353 for capacitor 380, node 354 for capacitor 381, and node 352 for capacitor 382.

Figure 4:
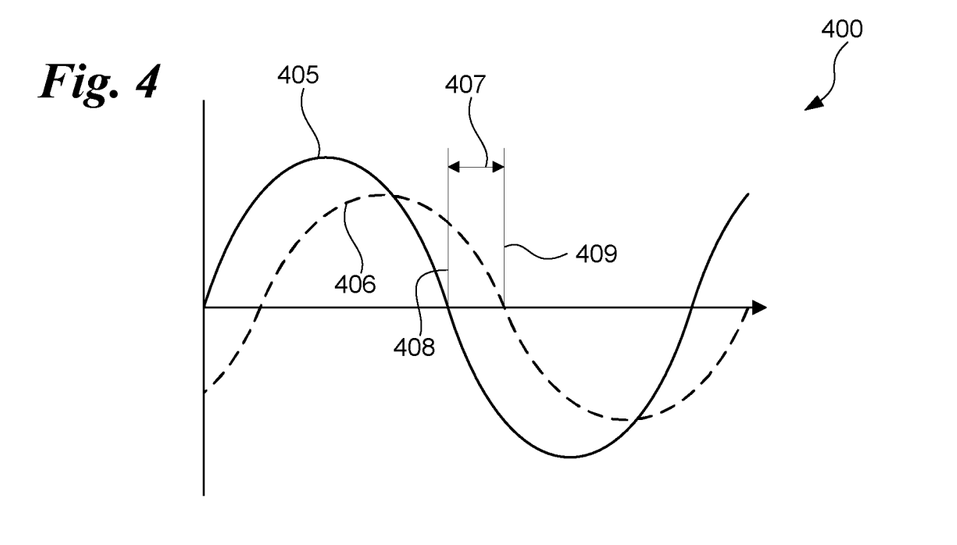
FIG. 4 is a diagram illustrating voltage and current supplied to a load where a power factor correction circuit of the present disclosure is inactive.
Figure 5:
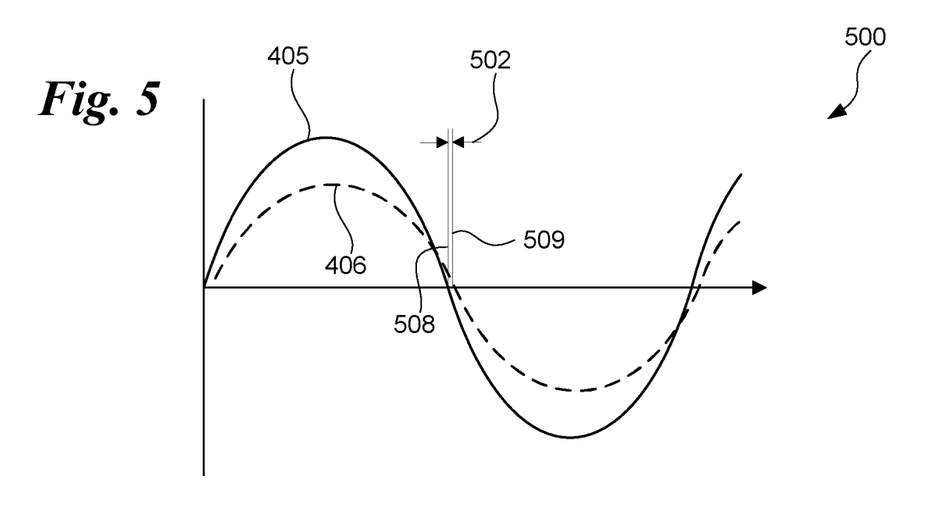
FIG. 5 is a diagram illustrating the voltage and current of FIG. 4 after a power factor correction circuit of the present disclosure is activated.

Illustrated in FIGS. 4 and 5 is an example of the resulting output that may be achieved by the disclosed power factor correction circuits. At 400 in FIG. 4 is illustrated an output voltage and current provided by a power source of the present disclosure prior to activation of the disclosed power factor correction circuit. The voltage 405 is illustrated as a solid line, and it is somewhat out of phase with a current illustrated as a dashed line at 406. The phase angle 407 illustrates the difference in time between when the voltage 405 reaches a predetermined point (0 volts in this case) at 408, and when the current 406 reaches the same predetermined point (0 amps) 409.

At 500 in FIG. 5 is illustrated the output voltage 405 and current 406 provided by a power source of the present disclosure after activation of the disclosed power factor correction circuit. The resulting phase angle 503 is different than phase angle 407, preferably substantially smaller thus illustrating that the difference in time between when the voltage 405 reaches a predetermined point (0 volts in this case) at 508, and when the current 406 reaches the same predetermined point (0 amps) 509 is now substantially closer together in time. This results in a more efficient transfer of power from a power source to a load.

Figure 6:
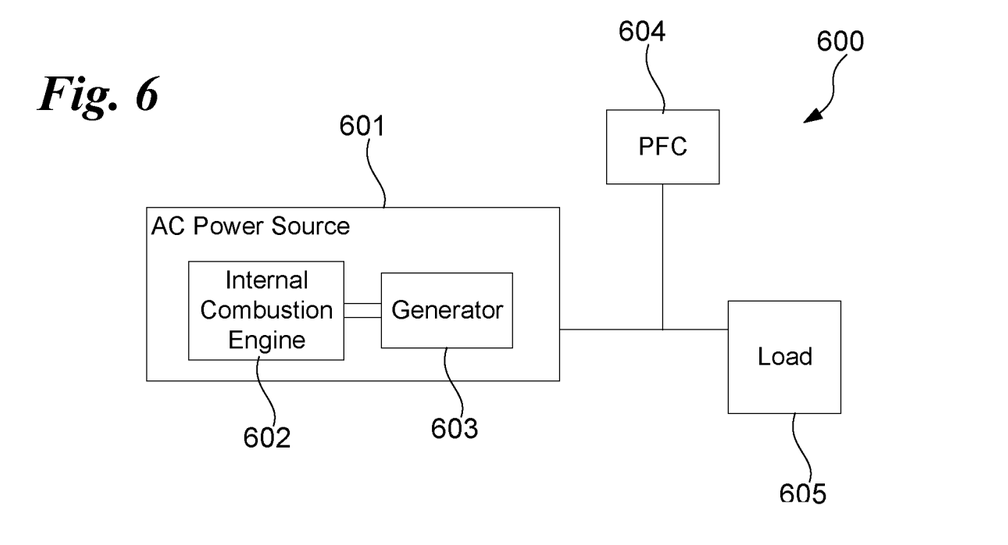
FIG. 6 is a component diagram illustrating an example of a power factor correction system of the present disclosure configured for use with a generator.

Illustrated in FIG. 6 at 600 is another example of the disclosed concepts. A power factor correction circuit 604 of the present disclosure is electrically connected to an AC power source 601 that includes a generator 603 coupled to an internal combustion engine 602. The power source 601 is electrically connected to a load 605.

Figure 7:
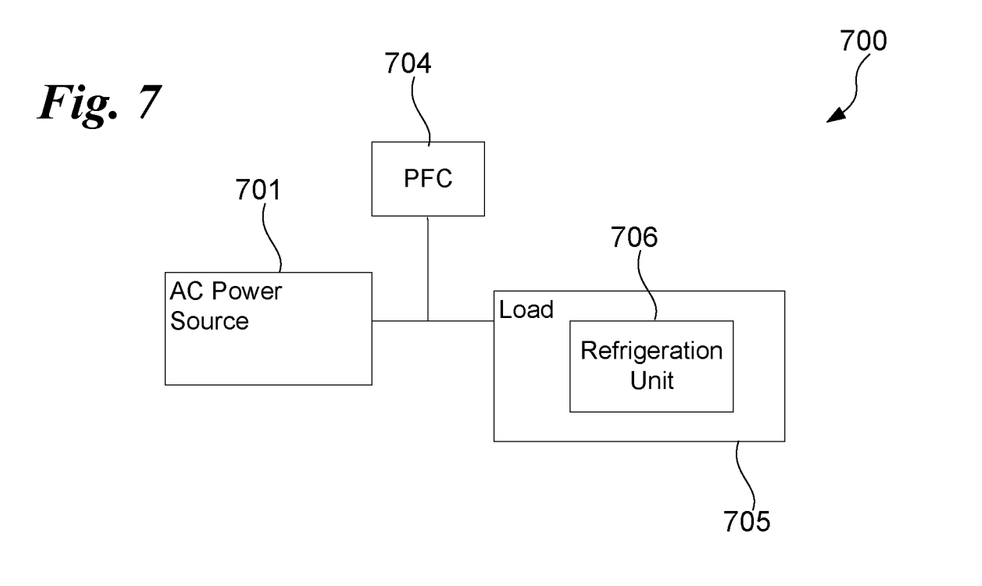
FIG. 7 is a component diagram illustrating an example of a power factor correction system of the present disclosure configured for use with a refrigeration unit.

In another example illustrated in FIG. 7 at 700, a power factor correction circuit 704 of the present disclosure is electrically connected to an AC power source 701 that is optionally electrically connected to a load 705. In this example, the load optionally includes a refrigeration unit 706 that may be configured to refrigerate a closed space.

Figure 8:
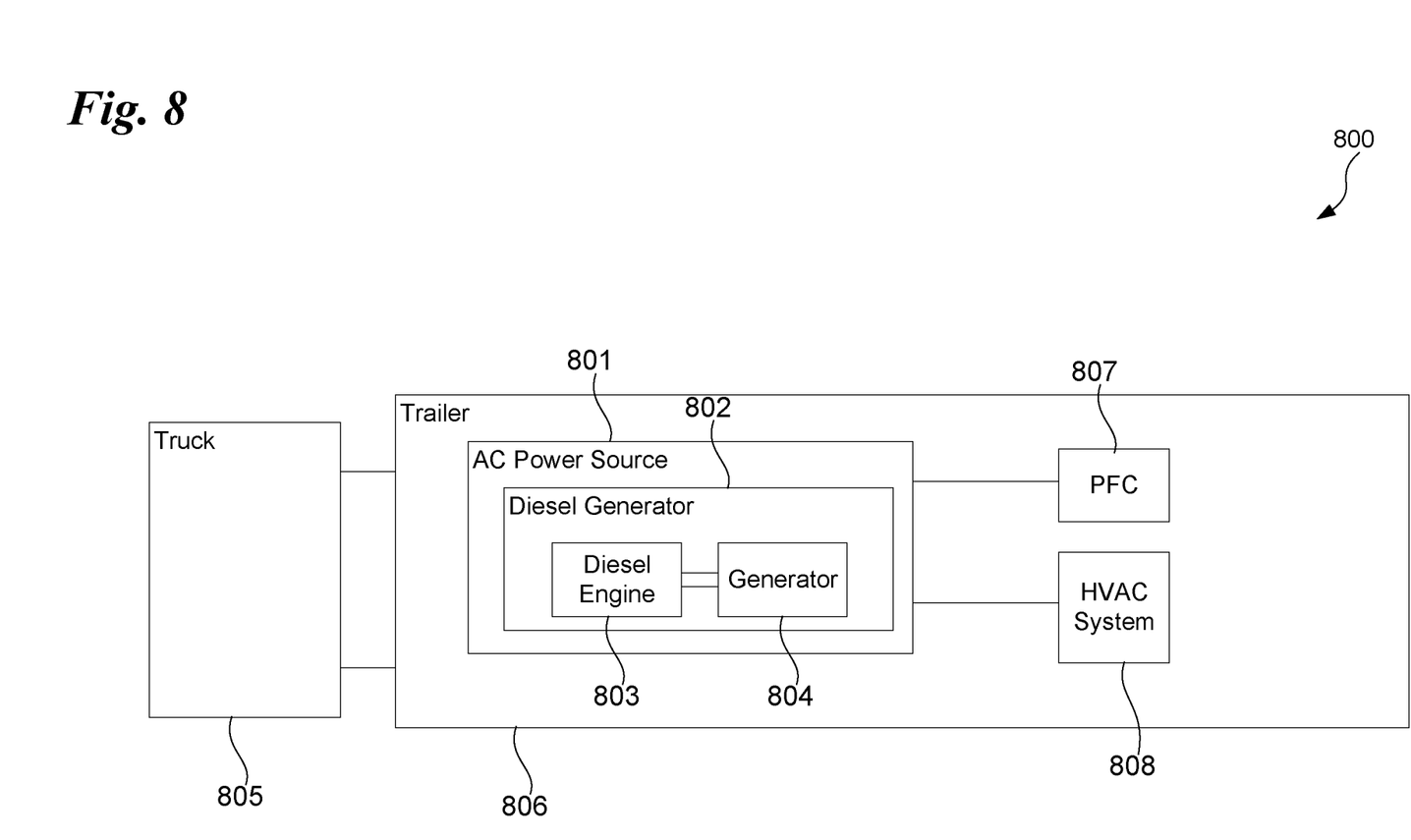
FIG. 8 is a component diagram illustrating an example of a power factor correction system of the present disclosure configured for use with a truck and trailer.

In another example illustrated in FIG. 8 at 800, an AC power source 801 optionally includes a diesel generator 802. The diesel generator 802 optionally includes a diesel engine 803 that may be coupled to a generator 804 such that mechanical power from the diesel generator 802 activates the generator 804 to generator electrical power provided to a Heating, Ventilating, and Air Conditioning System (HVAC) 808. The HVAC system 808 may be configured to heat or cool, or otherwise control the environmental conditions of a trailer 806 that is optionally configured to be towed by a truck 805. A power factor correction 807 of the present disclosure is optionally electrically connected to the AC power source 801.

Figure 9:
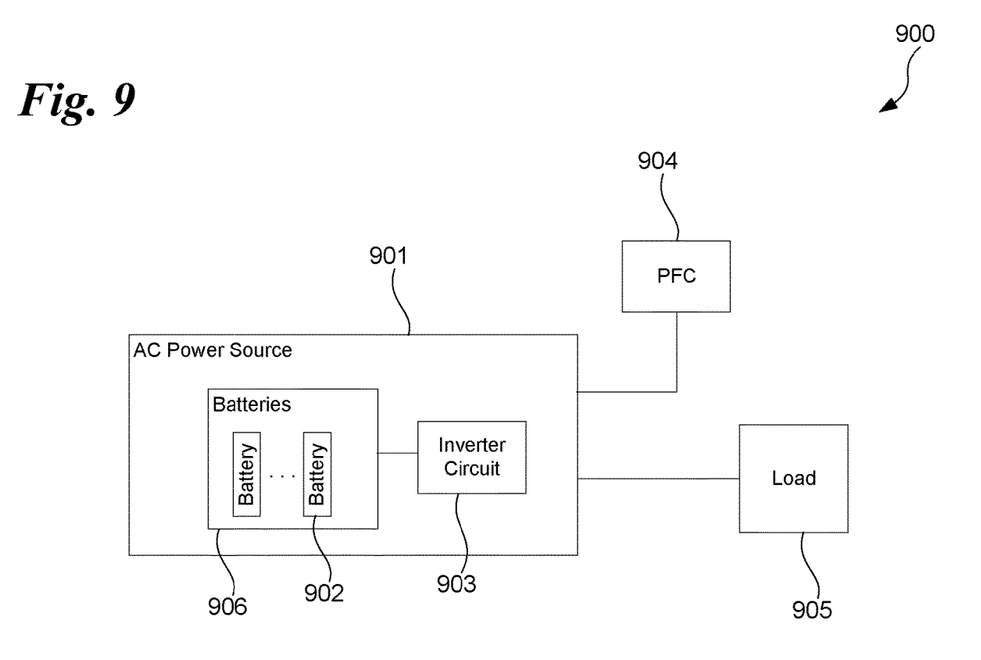
FIG. 9 is a component diagram illustrating an example of a power factor correction system of the present disclosure configured for use with an inverter circuit.

In another example illustrated in FIG. 9 at 900, an AC power source 901 optionally includes at least one battery 902 electrically connected to an inverter circuit 903. The inverter circuit is arranged and configured to convert DC power delivered from the battery 902 to AC power to be delivered to a load 905. Battery 902 may be one of multiple batteries 906 electrically connected together to provide power to the inverter circuit 903. These batteries may be connected in series, in parallel, or in any combination of series and parallel. Any suitable number of batteries may be used for batteries 906 such as less than 10 batteries, less than 100 batteries, or 100 batteries or more. A power factor correction circuit 904 of the present disclosure is optionally electrically connected to the AC power source 901 to reduce or eliminate the phase angle between the voltage and current delivered to the load 905 as discussed above.

The concepts illustrated and disclosed herein related to a power factor correction circuit may be arranged and configured according to any of the following non-limiting numbered examples:

Aspect 1 generally concerns a system that includes a power factor correction circuit for use in diesel refrigeration units.

Aspect 2 generally concerns the system of any previous aspect in which the circuit includes a transient voltage surge suppressor (TVSS).

Aspect 3 generally concerns the system of any previous aspect in which the circuit includes an illuminated fault detection system.

Aspect 4 generally concerns the system of any previous aspect in which the circuit is a single or double phase 240 volt (V) power circuit.

Aspect 5 generally concerns the system of any previous aspect in which the single-phase circuit includes a parallel resistor-capacitor (RC) circuit.

Aspect 6 generally concerns the system of any previous aspect in which the circuit is a three-phase 480/208 V power circuit.

Aspect 7 generally concerns the system of any previous aspect in which the three-phase circuit includes a delta RC circuit.

Aspect 8 generally concerns the system of any previous aspect in which the circuit includes one or more capacitors and one or more resistors.

Aspect 9 generally concerns the system of any previous aspect in which the circuit includes one or more capacitors between 25 and 35 microfarads.

Aspect 10 generally concerns the system of any previous aspect in which the circuit includes one or more resistors between 400 and 500 kiloohms.

Aspect 11 generally concerns a system that includes a power factor correction circuit.

Aspect 13 generally concerns a system that includes a reefer trailer.

Aspect 14 generally concerns a system that includes a generator.

Aspect 15 generally concerns a system that includes a heating, ventilation and air conditioning (HVAC) system.

Aspect 16 generally concerns a method of operating the system of any previous aspect.

Other examples of the disclosed concepts include the following numbered examples:

Example 1: A system, comprising a vehicle; a power source; a heating, ventilation, and air conditioning (HVAC) system operatively connected to the power source; and a power factor correction circuit electrically connected between the power source and the HVAC system of the vehicle; wherein the power factor correction circuit includes a single-phase 240 volt (V) power circuit; wherein the circuit includes one or more capacitors and one or more resistors; and wherein the one or more capacitors are between 25 and 35 microfarads.

Example 2: The system of any preceding example, wherein the resistors and the capacitors are electrically connected in a parallel arrangement.

Example 3: The system of any preceding example, wherein one resistor and one capacitor in parallel define a parallel RC circuit, and wherein the power factor correction circuit includes two (2) parallel RC circuits Example 4: The system of any preceding example, wherein the two (2) parallel RC circuits are further connected in parallel with each other.

Example 6: The system of any preceding example, wherein the power source includes a diesel generator.

Example 7: A system, wherein the power factor correction circuit includes a three-phase 480/208 volt (V) power circuit; wherein the circuit includes one or more capacitors and one or more resistors; and wherein the one or more capacitors are between 25 and 35 microfarads.

Example 8: The system of any preceding example, wherein the circuit includes one or more resistors between 400 and 500 kiloohms.

Example 9: The system of any preceding example, wherein the resistors and the capacitors are electrically connected in a parallel arrangement.

Example 10: The system of any preceding example, wherein one resistor and one capacitor in parallel define a parallel RC circuit, and wherein the power factor correction circuit includes three parallel RC circuits Example 11: The system of any preceding example, wherein the three parallel RC circuits are electrically connected to form a delta RC circuit.

Example 12: The system of any preceding example, wherein the circuit includes an illuminated fault detection system.

Example 13: The system of any preceding example, wherein the circuit includes a transient voltage surge suppressor (TVSS).

Example 14: The system of any preceding example, wherein the vehicle includes a trailer.

Example 15: The system of any preceding example, wherein the power source includes a diesel generator.

Example 16: A power factor correction circuit, comprising: a first RC circuit including a first resistor and a first capacitor electrically connected to a first node and a second node, wherein the first and second nodes are electrically connected to separate terminals of an AC power source; a second separate RC circuit including a second resistor and second capacitor electrically connected to the first node and the second node; wherein the first and second resistors are between 250 and 650 kiloohms; wherein the first and second capacitors are between 15 and 50 microfarads; wherein the first resister is electrically connected in parallel with the first capacitor, and wherein the second resistor is electrically connected in parallel with the second capacitor.

Example 17: The power factor correction circuit of example 16, wherein either the first or second capacitor has an anode and a cathode, wherein the anode of the first or second capacitors is electrically connected to the first node, and wherein the cathode of the first or second capacitors is electrically connected to the second node.

Example 18: The power factor correction circuit of any one of examples 16-17, wherein the voltage across the first and second nodes is between 100 and 250 volts AC.

Example 19: The power factor correction circuit of any one of examples 16-18, wherein the separate terminals of the AC power source include a neutral terminal and a hot terminal, and wherein the first node is electrically connected to the hot terminal, and the second node is electrically connected to the neutral terminal.

Example 20: The power factor correction circuit of any one of examples 16-19, wherein the separate terminals of the AC power source includes two hot terminals, and wherein the first and second nodes are each electrically connected to one of the two hot terminals.

Example 21: The power factor correction circuit of claim any one of examples 16-20, comprising: a surge suppression circuit that includes a Transient Voltage Surge Suppressor (TVSS) that is electrically connected to the first and second nodes, and to a ground.

Example 22: The power factor correction circuit of claim any one of examples 16-21, comprising: a third RC circuit including a third resistor and a third capacitor electrically connected to a third node; wherein the third node is electrically connected to another of the separate terminals of the AC power source; wherein the third and resistor is between 250 and 650 kiloohms; wherein the third capacitor is between 15 and 50 microfarads; wherein the third resister is electrically connected in parallel with the third capacitor; and wherein the third RC circuit is electrically connected to the first node.

Example 23: The power factor correction circuit of claim example 22, wherein the voltage across any two of the first, second, or third nodes is greater than 400 volts AC.

Example 24: The power factor correction circuit of example 22, wherein the separate terminals of the AC power source are hot terminals.

Example 25: The power factor correction circuit of example 22, wherein the AC power source provides differing time varying voltages to the first, second, and third nodes that vary out of phase with one another.

Example 26: The power factor correction circuit of example 25, wherein the time varying voltages may vary 120 degrees out of phase with each other.

Example 27: The power factor correction circuit of any one of examples 16-27, comprising: a surge suppression circuit that includes a Transient Voltage Surge Suppressor (TVSS) that is electrically connected to the first, second, and third nodes, and to a ground.

Example 28: The power factor correction circuit of any one of examples 16-27, wherein the AC power source includes at least one battery electrically connected to an inverter circuit configured to convert DC power delivered from the at least on battery to AC power, and wherein the inverter circuit is electrically connected to the first, second, and third nodes to deliver AC power to the first, second, and third RC circuits.

Example 29: The power factor correction circuit of any one of examples 16-28, wherein the AC power source includes a generator coupled to an internal combustion engine.

Example 30: The power factor correction circuit of any one of examples 16-29, wherein the load includes a refrigeration unit electrically connected to the AC power source.

Example 31: The power factor correction circuit of any one of examples 16-30, wherein the power source is mounted within a vehicle.

Example 32: The power factor correction circuit of any one of examples 16-31, wherein the load is mounted within the vehicle.

Example 33: The power factor correction circuit of any one of examples 16-32, wherein the power factor correction circuit and the load are mounted within a vehicle, and the power source is outside the vehicle and coupled to the power factor correction circuit and the load by one or more cables.

Example 34: The power factor correction circuit of any one of examples 16-33: wherein the AC power source includes a diesel generator; wherein the AC power source is located within a trailer configured to be towed by a tractor;

wherein the load includes a heating, ventilation, and air conditioning (HVAC) system operatively connected to the AC power source.

Example 35: The power factor correction circuit of any one of examples 16-234, wherein the AC power source includes at least one battery electrically connected to an inverter circuit configured to convert DC power delivered from the at least one battery to AC power, and wherein the inverter circuit is electrically connected to the first and second terminals of the AC power source.

Glossary of Definitions and Alternatives

While the invention is illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the invention. No limitation of the scope of the invention is thereby intended. Any alterations and further modifications in the described examples, and any further applications of the principles described herein are contemplated as would normally occur to one skilled in the art to which the invention relates. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"About" with reference to numerical values generally refers to plus or minus 10% of the stated value. For example, if the stated value is 4.375, then use of the term "about 4.375" generally means a range between 3.9375 and 4.8125.

"Activate" generally is synonymous with "providing power to", or refers to "enabling a specific function" of a circuit or electronic device that already has power.

"And/or" generally refers to a grammatical conjunction indicating that one or more of the cases it connects may occur. For instance, it can indicate that either or both of two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Amperage Threshold" here means a power value, expressed in amps or amperes of electricity when passed through a resistance, measured at the vehicle industry standard design voltage of 12.8 volts.

"Battery" generally refers to an electrical energy storage device or storage system including multiple energy storage devices. A battery may include one or more separate electrochemical cells, each converting stored chemical energy into electrical energy by a chemical reaction to generate an electromotive force (or "EMF" measured in Volts). An individual battery cell may have a positive terminal (cathode) with a higher electrical potential, and a negative terminal (anode) that is at a lower electrical potential than the cathode. Any suitable electrochemical cell may be used that employ any suitable chemical process, including galvanic cells, electrolytic cells, fuel cells, flow cells and voltaic piles. When a battery is connected to an external circuit, electrolytes are able to move as ions within the battery, allowing the chemical reactions to be completed at the separate terminals thus delivering energy to the external circuit.

A battery may be a "primary" battery that can produce current immediately upon assembly. Examples of this type include alkaline batteries, nickel oxyhydroxide, lithium-copper, lithium-manganese, lithium-iron, lithium-carbon, lithium-thionyl chloride, mercury oxide, magnesium, zinc-air, zinc-chloride, or zinc-carbon batteries. Such batteries are often referred to as "disposable" insofar as they are generally not rechargeable and are discarded or recycled after discharge.

A battery may also be a "secondary" or "rechargeable" battery that can produce little or no current until charged. Examples of this type include lead-acid batteries, valve regulated lead-acid batteries, sealed gel-cell batteries, and various "dry cell" batteries such as nickel-cadmium (NiCd), nickel-zinc (NiZn), nickel metal hydride (NiMH), and lithium-ion (Li-ion) batteries.

"Branch" means an electrical path through one or more electrical components which are connected in series "Breaks Current Flow" means to stop, or at least greatly impede, the flow of electrical current. This can be temporary or permanent "Capacitor" generally refers to a device that stores electrical energy. A capacitor generally includes one or more pairs of conductors separated by an insulator.

"Circuit Breaker" generally refers to an automatic device for stopping the flow of current in an electric circuit as a safety measure. In one form, the circuit breaker includes an automatically operated electrical switch designed to protect an electrical circuit from damage caused by any number of safety hazards, including (but not limited to) overcurrent, overload, and/or short circuit conditions. For instance, the circuit breaker is operable to interrupt current flow after protective relays detect a fault.

A circuit breaker optionally includes a mechanical switching device, capable of making, carrying, and breaking currents under normal circuit conditions. Circuit breakers are also usually capable of making and carrying for a specified time and breaking currents under specified abnormal circuit conditions, such as those of a short circuit. Circuit breakers are commonly designed to open and close a circuit by non-automatic means and to open the circuit automatically on a predetermined overcurrent without damage to itself when properly applied within the rating of the circuit breaker.

A circuit breaker may be designed to be reset (either manually or automatically) to resume normal operation after being tripped. Circuit breakers can be made in varying sizes, from small devices that protect an individual household appliance up to large switchgear designed to protect high voltage circuits feeding an entire city. Components of the circuit breaker can include a frame or case made of metal or some type of electrical insulation, electrical contacts, an arc extinguishing assembly, an operating mechanism, and a trip unit that can have a thermal element, a magnetic element, or both. Circuit breakers can be typically secured in place by a through bolt type connection, a stab-lock to the busbar (or some type of receptacle) type connection, a bolted to the busbar type connection, and/or a din rail mounted type connection. The term "circuit breaker" is used in a broad sense to include any Automatic Disconnection of Supply (ADS) device for automatically removing power from a faulty system. By way of non-limiting examples, the circuit breakers can include low-voltage circuit breakers, medium-voltage circuit breakers, high-voltage circuit breakers, magnetic circuit breakers, thermal magnetic circuit breakers, explosive circuit breakers, common trip breakers, sulfur hexafluoride (SF6) high-voltage circuit breakers, disconnecting circuit breakers (DCBs), and carbon dioxide (CO2) high-voltage circuit breakers.

"Conductor" or "Conductive Material" generally refers to a material and/or object that allows the free flow of an electrical charge in one or more directions such that relatively significant electric currents will flow through the material under the influence of an electric field under normal operating conditions. By way of non-limiting examples, conductors include materials having low resistivity, such as most metals (e.g., copper, gold, aluminum, etc.), graphite, and conductive polymers.

"Controller" or "control circuit" generally refers to a mechanical or electronic device configured to control the behavior of another mechanical or electronic device. A controller or "control circuit" is optionally configured to provide signals or other electrical impulses that may be received and interpreted by the controlled device to indicate how it should behave.

"Current" generally refers to the rate of flow of electric charge past a point or region of an electric circuit. An electric current is said to exist when there is a net flow of electric charge through a region.

"Delta Connection" generally refers to a series connection of three elements in a three-phase circuit forming a triangular shape. Generally, the three corners of the delta are connected to the three wires of the supply circuit.

"Electrical Connection" means here a connection between two objects that allows a flow of electric current and/or electric signals.

"Electrically Connected" generally refers to a configuration of two objects that allows electricity to flow between them or through them. In one example, two conductive materials are physically adjacent one another and are sufficiently close together so that electricity can pass between them. In another example, two conductive materials are in physical contact allowing electricity to flow between them.

"Energy Source" generally refers to a device, structure, mechanism, and/or system that provides power for performing work. The energy supplied by the energy source can take many forms including electrical, chemical, electrochemical, nuclear, hydraulic, pneumatic, gravitational, kinetic, and/or potential energy forms. The energy source for instance can include ambient energy sources, such as solar panels, external energy sources, such as from electrical power transmission networks, and/or portable energy sources, such as batteries. The energy source can include an energy carrier containing energy that can be later converted to other forms, such as into mechanical, heat, electrical, and/or chemical forms. Energy carriers can for instance include springs, electrical batteries, capacitors, pressurized air, dammed water, hydrogen, petroleum, coal, wood, and/or natural gas, to name just a few.

"Fail Open" means to stop conducting current due to an internal component failure.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to "Fuse" means a safety device a material that melts and breaks an electric circuit if the current through the material exceeds a specified safe level.

"Ground Cable" generally refers to a cable electrically connecting to a circuit ground.

"Ground" or "Circuit Ground" generally refers to a node in an electrical circuit that is designated as a reference node for other nodes in a circuit. It is a reference point in an electrical circuit from which voltages are measured, a common return path for electric current, and/or a direct physical connection to the Earth.

"Hot" or "Load" generally refers to a portion of an AC power circuit that delivers alternating voltage and current (AC power).

"Impedance" generally refers to the opposition to alternating current presented by the combined effect of resistance and reactance in a circuit.

"Insulator" or "Insulative Material" generally refers to a material and/or object whose internal electric charges do not flow freely such that very little electric current will flow through the material under the influence of an electric field under normal operating conditions. By way of non-limiting examples, insulator materials include materials having high resistivity, such as glass, paper, ceramics, rubber, and plastics.

"LED" means light emitting diode, including single diodes as well as arrays of LED's and/or grouped light emitting diodes. This can include the die and/or the LED film or other laminate, LED packages, said packages may include encapsulating material around a die, and the material, typically transparent, may or may not have color tinting and/or may or may not have a colored sub-cover. An LED can be a variety of colors, shapes, sizes and designs, including with or without heat sinking, lenses, or reflectors, built into the package.

"Multi-phase" generally refers to an alternating current electric power source in which the voltages of the power source do not vary in unison with time. In a multi-phase AC source, the individual power sources that make up the overall source are time shifted (or "phase shifted") so that the separate sources do not reach their maximum and minimum values at the same time.

In one example, power source may provide separate voltage outputs that both vary at about the same frequency such that each separate voltage output may be at or near its highest value when the other voltage output is at or near its lowest value. In this example, the two outputs are said to be "180 degrees out of phase" because their maximums and minimums coincide in time.

In another example, the power source may provide three separate voltage outputs that both vary at about the same frequency. Each of the three individual sources may be at its maximum positive value at about the same time that the voltage of the other two sources is negative, and about equal, but is rising in one, and falling in the other. Conversely, each of the three individual sources may be at its maximum negative value (i.e. minimum voltage) at about the same time that the voltage of the other two sources is positive, and about equal, but is rising in one, and falling in the other. In this configuration, all three voltage sources are said to be "120 degrees out of phase".

"Multiple" as used herein is synonymous with the term "plurality" and refers to more than one, or by extension, two or more.

"Neutral" generally refers to a portion of an AC power circuit that provides a return path for current from the "hot" side of the AC power circuit. The neutral connection is often electrically and physically coupled to the earth, although this is not required in all cases. For example, the neutral wire generally forms a part of a live circuit along with the hot wire, whereas the ground wire is generally connected to other metal parts in a device that uses AC power. This is a safety feature in case the hot or neutral wires somehow come in contact with the metal parts of the device.

"Node" means an electrical junction between two or more electrical components, wherein the voltage at all physical points within the node is substantially equal.

"Over-current Protection Device" means any one or more devices, components and/or circuits that break current flow in response to current at or above a predetermined value or parameter. This includes, without limitation, circuit breakers, fuses, solid state devices, circuits, and otherwise.

"Optionally" as used herein means discretionary; not required; possible, but not compulsory; left to personal choice.

"Parallel" means an electrical connection of two or more components where the voltage across the input and output terminals of the components is equal.

"Phase" generally refers to an angle-like quantity representing the fraction of a cycle covered up to a given period of time, usually expressed in terms of an angle where a full cycle is 360 degrees.

The notion of phase is relevant to any value that changes with time in a periodic fashion. Over the course of one "period" (that is one full cycle) of time the value, changes between a maximum and minimum value (e.g. voltage or current in an AC circuit, or the position of a weight bouncing on spring, etc.). This value may then be associated with the time at which it is measured with respect to the overall time to complete a full cycle between the maximum and minimum values. For example, values observed at ¼ of a cycle will be about the same for every cycle. Values observed at ½ of a cycle, or at ¾ of a cycle will also be about the same for every cycle. Thus we can say the value is truly changing "periodically" because the value is about the same at each time during each individual period.

The value relative to the time it takes for the value to change over a full cycle may be expressed in relation to degrees of a circle. For example, it may be said the cycle starts at time 0 with a value of 0. At a time ¼ of the way through the cycle, the value may be expressed as "the value at 90 degrees" because 90 degrees is ¼ of a full circle of 360 degrees. At ½ of the way through the cycle, the value may be expressed as the value at 180 degrees (which is half of 360). At $\frac{5}{6}^{th}$ of the way through a full cycle, the value may be expressed as the value at 300 degrees, and so on. Thus the time changing value may be considered at different times expressed in degrees, and this value is generally referred to as the "phase".

"Phase Angle" generally refers to the difference in time between when two different time varying values arrive at a predetermined value (e.g. zero, or the maximum value). The time difference may be expressed as an angle representing the fraction of a full period (360 degrees) that the first value leads or lags the second value.

For example, if the first value reaches zero at a time that is ¼ of a full period after the second value reaches zero, the phase angle is said to be "90 degrees" (¼ of 360). If the first and second values complete a full period in one minute, then in this example, the first value lags behind the second value by ¼ of a minute or 15 seconds. In another example, the first value reaches its maximum value at a time that is $\frac{1}{3}^{rd}$ of a full period before the second value reaches its maximum value, the phase angle is said to be "120 degrees" ($\frac{1}{3}^{rd}$ of 360). If the first and second values complete a full period in one second, then in this example, the first value leads the second value by ⅓ of a second. Thus in all of these examples, the first and second values are said to be "out of phase" with each other because the reach predetermined points in their individual cycles at different times.

"Power Cable" generally refers to a cable configured to transfer electrical power as part of an electrical circuit. A power cable may be used exclusively to transfer power, or it may be used to also transfer signals, such as in the case of a Power Line Communication (PLC) system.

"Power Converter" generally refers to a device that changes one form of energy to another form. In electrical systems, power converters change electric energy from one form to another, such as converting alternating current (AC) to direct current (DC) (or vice-versa) and/or changing electrical voltage, current, frequency, and/or phase of the electricity. For DC to DC conversion, the power converter can include voltage regulators and/or linear regulators. The power converter can include an inverter to change DC to AC, and the power converter can include a rectifier to change AC to DC. For AC to AC conversion, the power converter can include a transformer, autotransformer, variable-frequency transformer, voltage converter, voltage regulator, and/or cycloconverter. These of course are just a few non-limiting examples. Power converters can also change other forms of energy, such as mechanical and/or chemical energy, to name just a few. For instance, the power converter can include a hydraulic pump that converts electrical energy to mechanical energy when the energy storage system is in the form of a hydraulic accumulator.

"Power Factor Correction" generally refers to a method of bringing the power factor of a circuit nearer to unity and/or a power factor of one (1) by using equipment to absorb and/or supply reactive power to the circuit. Generally, power factor correction uses inductors and/or capacitors to adjust a phase angle between the voltage and the current in the circuit.

"Power Supply" or "Power Source" generally refers to an electrical device that provides electrical power to an electrical load, such as electrical machines and/or electronics.

"Portion" means a part of a whole, either separated from or integrated with it.

"Predominantly" as used herein is synonymous with greater than 50%.

"Reactance" generally refers to the opposition presented to current by inductance and/or capacitance. For example, a greater reactance gives a smaller current value per the same applied voltage.

"Resistance" generally refers to a measure of the opposition to current flow in an electrical circuit. Resistance is generally expressed in Ohms.

"Resistor" means a device having a resistance to the passage of electrical current.

"Resistor-Capacitor Circuit" generally refers to a circuit with one or more resistors and one or more capacitors.

"Series" means an electrical connection of two or more components where current passes through the first component and into the second component, and where the current passing through the two components is the same.

"Single Phase" generally refers to an alternating current electric power source in which all the voltages of the power source vary in unison with time.

"Three phase" generally refers to a multi-phase alternating current electric power source in which three separate voltage sources are provided that varying differently with time. In one example, the three voltage sources are preferably 120 degrees out of phase.

"Transient Voltage Surge Suppressor" generally refers to a device configured to protect electrical and electronic equipment from power surges and/or voltage spikes. A TVSS diverts the excess voltage and/or current into ground and/or a grounding wire to prevent the excess voltage and/or current from flowing through the electrical equipment. The TVSS simultaneously allows the normal voltage to continue through the circuit. Thus, the TVSS only diverts the excess voltage over the normal amount to ground.

"Vehicle" means a self-propelled or towed device for transportation, including without limitation, car, truck, bus, boat, tank or other military vehicle, airplane, truck trailer, truck cab, boat trailer, other trailer, emergency vehicle, and motorcycle.

The invention claimed is:

1. A power factor correction circuit, comprising:
a first RC circuit including a first resistor and a first capacitor electrically connected to a first node and a second node, wherein the first and second nodes are electrically connected to separate terminals of an AC power source;
a second separate RC circuit including a second resistor and second capacitor electrically connected to the first node and the second node;
wherein the first resister is electrically connected in parallel with the first capacitor, and wherein the second resistor is electrically connected in parallel with the second capacitor.

2. The power factor correction circuit of claim 1, wherein either the first or second capacitor has an anode and a cathode, wherein the anode of the first or second capacitors is electrically connected to the first node, and wherein the cathode of the first or second capacitors is electrically connected to the second node.

3. The power factor correction circuit of claim 1, wherein a voltage across the first and second nodes is between 100 and 250 volts AC.

4. The power factor correction circuit of claim 1, wherein the separate terminals of the AC power source include a neutral terminal and a hot terminal, and wherein the first node is electrically connected to the hot terminal, and the second node is electrically connected to the neutral terminal.

5. The power factor correction circuit of claim 1, wherein the separate terminals of the AC power source include two hot terminals, and wherein the first and second nodes are each electrically connected to one of the two hot terminals.

6. The power factor correction circuit of claim 1, comprising:
a surge suppression circuit that includes a Transient Voltage Surge Suppressor (TVSS) that is electrically connected to the first and second nodes, and to a ground.

7. The power factor correction circuit of claim 1, comprising:
a third RC circuit including a third resistor and a third capacitor electrically connected to a third node;
wherein the third node is electrically connected to another of the separate terminals of the AC power source;
wherein the third resistor is between 250 and 650 kiloohms;
wherein the third capacitor is between 15 and 50 microfarads;
wherein the third resister is electrically connected in parallel with the third capacitor; and
wherein the third RC circuit is electrically connected to the first node.

8. The power factor correction circuit of claim 7, wherein the voltage across any two of the first, second, or third nodes is greater than 400 volts AC.

9. The power factor correction circuit of claim 7, wherein the separate terminals of the AC power source are hot terminals.

10. The power factor correction circuit of claim 7, wherein the AC power source provides differing time varying voltages to the first, second, and third nodes that vary out of phase with one another.

11. The power factor correction circuit of claim 10, wherein the time varying voltages may vary 120 degrees out of phase with each other.

12. The power factor correction circuit of claim 7, comprising:
a surge suppression circuit that includes a Transient Voltage Surge Suppressor (TVSS) that is electrically connected to the first, second, and third nodes, and to a ground.

13. The power factor correction circuit of claim 7, wherein the AC power source includes at least one battery electrically connected to an inverter circuit configured to convert DC power delivered from the at least on battery to AC power, and wherein the inverter circuit is electrically connected to the first, second, and third nodes to deliver AC power to the first, second, and third RC circuits.

14. The power factor correction circuit of claim 1, wherein the AC power source includes a generator coupled to an internal combustion engine.

15. The power factor correction circuit of claim 1, wherein a load that includes a refrigeration unit is electrically connected to the AC power source.

16. The power factor correction circuit of claim 1, wherein the AC power source is mounted within a vehicle.

17. The power factor correction circuit of claim 16, wherein a load electrically connected to the AC power source is mounted within the vehicle.

18. The power factor correction circuit of claim 1, wherein the power factor correction circuit and the load are mounted within a vehicle, and the power source is outside the vehicle and coupled to the power factor correction circuit and the load by one or more cables.

19. The power factor correction circuit of claim 1:
- wherein the AC power source includes a diesel generator;
- wherein the AC power source is located within a trailer configured to be towed by a tractor;
- wherein a load electrically connected to the AC power source includes a heating, ventilation, and air conditioning (HVAC) system operatively connected to the AC power source.

20. The power factor correction circuit of claim 1, wherein the AC power source includes at least one battery electrically connected to an inverter circuit configured to convert DC power delivered from the at least one battery to AC power, and wherein the inverter circuit is electrically connected to the first and second terminals of the AC power source.

* * * * *